United States Patent [19]

Fujii

[11] Patent Number: 4,548,778
[45] Date of Patent: Oct. 22, 1985

[54] METHOD OF PRODUCING THERMOPLASTIC RESIN SHEET OR FILM

[75] Inventor: Atsushi Fujii, Sodegaura, Japan

[73] Assignee: Idemitsu Petrochemical Co., Ltd., Tokyo, Japan

[21] Appl. No.: 535,661

[22] Filed: Sep. 26, 1983

[51] Int. Cl.$^4$ ............................................. B29F 3/08
[52] U.S. Cl. ..................................... 264/180; 264/557; 264/562; 264/178 R; 425/71; 425/224; 425/379 R
[58] Field of Search ..................... 264/28, 216, 178 R, 264/180, 237, 555–562; 425/224, 71, 379 R

[56] References Cited

U.S. PATENT DOCUMENTS

| | | | |
|---|---|---|---|
| 2,728,951 | 1/1956 | O'Hanlon et al. | 264/178 R |
| 3,119,151 | 1/1964 | Corbett | 425/71 |
| 3,199,148 | 8/1965 | Koppehele | 264/180 |
| 3,361,728 | 1/1968 | Coen et al. | 264/216 |
| 3,402,428 | 9/1968 | Schreiber | 425/71 |
| 3,822,333 | 7/1974 | Haruta et al. | 264/178 R |
| 3,862,285 | 1/1975 | North et al. | 264/180 |
| 4,078,033 | 3/1978 | Czerwon et al. | 264/178 R |

FOREIGN PATENT DOCUMENTS

| | | | |
|---|---|---|---|
| 2457250 | 6/1976 | Fed. Rep. of Germany | 425/71 |
| 2602885 | 7/1977 | Fed. Rep. of Germany | 425/71 |
| 43-17817 | 7/1968 | Japan | 264/237 |
| 53-86759 | 7/1978 | Japan | 264/210.2 |
| 55-105532 | 8/1980 | Japan | 264/178 R |
| 57-55291 | 4/1982 | Japan . | |
| 1204057 | 9/1970 | United Kingdom | 264/237 |

*Primary Examiner*—Jeffery Thurlow
*Attorney, Agent, or Firm*—Frishauf, Holtz, Goodman & Woodward

[57] ABSTRACT

A method of producing a thermoplastic sheet or film characterized in that a molten thermoplastic resin sheet extruded through a T-die is cooled by introducing it into a multi-stage slit in which a cooling water is flowing. The water level in the first slit of the multi-stage slit is maintained at as low a level as possible. The method produces various advantages over conventional methods; for example, the sheet or film is free from unevenness in thickness, wrinkles, and curls, and is of high uniformity, and the sheet or film can be formed by high-speed molding of at least 10 m/min. The sheet or film is suitable for use in wrapping of, for example, foods and medicines.

17 Claims, 2 Drawing Figures

METHOD OF PRODUCING THERMOPLASTIC RESIN SHEET OR FILM

FIELD OF THE INVENTION

The present invention relates to a method of producing thermoplastic resin sheet or film.

BACKGROUND OF THE INVENTION

As a method of producing thermoplastic resin sheet or film by quenching the thermoplastic resin material extruded through a T-die, a chill roll method and a water quenching method, for example, are known.

The chill roll method, however, has various disadvantages. For example, since during high-speed molding, air is caught between a roll and a molten resin sheet or the contact between the roll and the molten resin sheet is poor, unevenness in thickness and wrinkles are formed; and in the case of the production of, for example, thicker sheet, the difference in the degree of cooling between the obverse and reverse surfaces of the molten resin sheet causes curling, and insufficient quenching is responsible for a reduction in transparency or surface luster of the final product.

Also the water quenching method suffers from disadvantages in that insufficient or uneven cooling of a molten resin sheet, which is caused by swelling or swaying of the water surface due to a local radiation of the heat from the molten resin sheet on the surface of cooling water, gives rise to the formation of haze dots and uneveness in thickness and further to a reduction or unevenness in transparency and surface luster, and therefore high-speed molding cannot be conducted.

An advantage of the water quenching method over the chill roll method is that sheet or film can be cooled efficiently. For this reason, a method has been proposed to overcome the above-described problems of the water quenching method, in which the molten resin sheet is cooled by a cooling water stream flowing on both sides thereof. However, even in accordance with this improved method, properties such as transparency of the sheet or film and high-speed moldability are not sufficiently satisfactory. This tendency becomes noticeable as the thickness of the sheet or film is high or the molding rate is increased.

I have already developed a method of forming thermoplastic resin sheet or film, which overcomes the problems as described above (see Japanese Patent Application No. 55291/1982). Thus the present invention provides an improved method over the foregoing method.

SUMMARY OF THE INVENTION

The present invention relates to a method of producing a thermoplastic resin sheet or film, characterized in that a thermoplastic resin sheet extruded in a molten state through a T-die is introduced in a multi-stage slit in which a cooling water flows.

Figure 1:
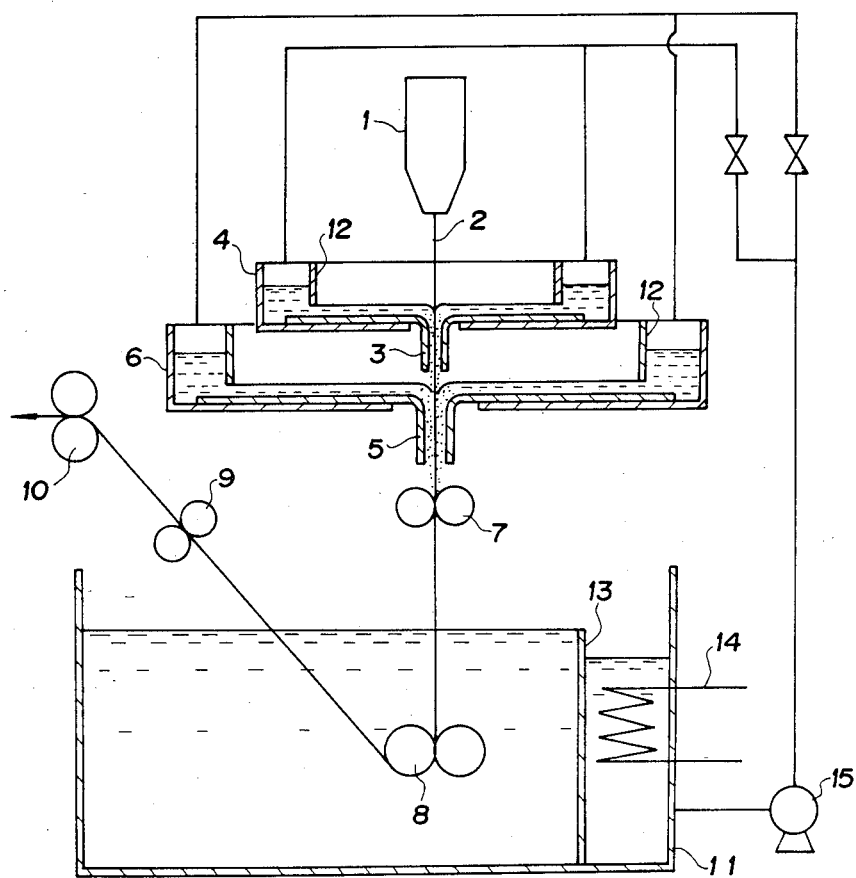
FIG. 1 is a schematic diagram showing an embodiment of the method of the present invention.

The reference numerals are as follows:

1 ... T-die, 2 ... Sheet-shaped thermoplastic resin, 3 ... First slit, 4 ... First water bath, 5 ... Second slit, 6 ... Second water bath.

DETAILED DESCRIPTION OF THE INVENTION

Various thermoplastic resins can be used in the production of sheet or film by the method of the invention. Suitable examples are olefin-based resins, such as high density polyethylene, medium density polyethylene, low density polyethylene, polypropylene, polybutene-1, poly(4-methyl-pentene-1), copolymers of ethylene and other α-olefins or unsaturated acids (e.g., an ethylene/propylene copolymer, an ethylene/butene-1 copolymer, an ethylene/octene-1 copolymer, an ethylene/vinyl acetate copolymer, an ethylene/acrylic acid copolymer, etc.), and copolymers of propylene and other α-olefins or unsaturated acids; polyamide resins, such as Nylon 6 and Nylon 6,6; polyester resins, such as polyethylene terephthalate and polybutylene terephthalate; polyvinyl chloride resins; polyvinylidene chloride resins; polyvinyl alcohol resins; and polystyrene resins.

Especially, the present invention is effective when, of the thermoplastic resins as described above, crystalline thermoplastic resins causing various problems, such as in respect of transparency and surface properties are used. The method of the invention is preferably applicable to the production of sheet or film from olefin-based resins, particuarly propylene-based resins.

These propylene-based resins include a homopolymer of propylene and random or block copolymers of at least 80% by weight of propylene and other polymerizable monomers, having a density of from 0.895 to 0.915 gram per cubic centimeter and a melt index of from 0.1 to 10 grams per ten minutes, preferably from 0.3 to 5 grams per ten minutes.

The term "sheet or film" as used herein includes both a mono-layer sheet or film and a multi-layer sheet or film.

These crystaline thermoplastic resins may further contain nucleating agents. Suitable examples of such nucleating agents include aromatic mono- or poly-carboxylic acids, such as benzoic acid, p-tert-butylbenzoic acid, o-methylbenzoic acid, 2,4-dimethylbenzoic acid, α-naphthoic acid, m-chlorobenzoic acid, m-nitrobenzoic acid, o-aminobenzoic acid, isophthalic acid, terephthalic acid, monomethylphthalate phthalic acid, trimellitic acid, and pyromellitic acid, or their anhydrides, or their metal salts; aromatic sulfonic acids, such as benzenesulfonic acid, 2,5-dichlorobenzenesulfonic acid, m-xylenesulfonic acid, and α-naphthalenesulfonic acid, or their metal salts; aliphatic or aromatic oxy acids, such as malic acid, tartaric acid, citric acid, and salicylic acid, or their metal salts; saturated aliphatic or alicyclic dicarboxylic acids, such as oxalic acid, malonic acid, succinic acid, adipic acid, suberic acid, sebacic acid, or their anhydrides; cis-cyclohexane-1,4-dicarboxylic acid, or their metal salts; nucleus-substituted aliphatic monocarboxylic acids, such as monophenylacetic acid, diphenylglycolic acid, phenyldimethylacetic acid, and cyclohexylic acid, or their metal salts; dibenzylidene sorbitols, such as dibenzylidene sorbitol, dibenzylidene xylitol, dibenzylidene percitol, and dibenzylidene mannitol, and their derivatives in which the benzene nucleus is substituted by, for example, an alkyl group, an alkoxyl group, or a halogen atom; and inorganic powder, such as silica, talc, and zeolite. The metal salts as described above are the salts of metals belonging to Groups I to III of the Periodic Table, such as lithium, sodium, potassium, magnesium, calcium, zinc, and aluminum.

The amount of the nucleating agent added is usually from 0.005 to 1% by weight, preferably from 0.05 to 0.5% by weight based on the crystalline thermoplastic resin. If the amount of the nuceating agent added is less than 0.005% by weight, no sufficient effect can be obtained. On the other hand, even if the nucleating agent is added in excess of 1% by weight, no additional effect can be obtained, and thus it is uneconomical.

In the present invention, if necessary, additives such as surface active agents, lubricants, and antioxidants can be added to the crystalline thermoplastic resins containing the nucleating agents as described above.

The present invention is basically concerned with a method of producing thermoplastic sheet or film according to the water quenching process as described above.

In conventional methods, when a sheet-shaped thermoplastic resin in a molten state which was extruded through a T-die is introduced in a slit in which a cooling water is flowing, said resin is cooled unevenly and sheet or film having satisfactory transparency and surface luster cannot be obtained unless the water level in the slit is maintained at as low level as possible.

On the other hand, the present invention utilizes an at least two-stage slit. In the method of the invention, therefore, although the water level in the first slit should be set at the lowest possible level, the turbulence of the water stream in the subsequent slits does not exert appreciable influences on the quality of sheet or film, and it is not necessary to pay any special attention to the control of the water level in the subsequent slits. This is unexpected and astonishing. The term "multi-stage slit" as used herein means a from 2 to 5 stage slits and preferably a 2 or 3 stage slits.

It is therefore important in the present invention that attention should be paid so that the water level in the first slit is lowered as much as possible. However, the present invention does not need such special attention in connection with the second or later-stage slit.

An embodiment of the method of the invention will hereinafter be explained with reference to the accompanying drawings.

A sheet-shaped thermoplastic resin 2 as extruded in a molten state through a T-die 1 is introduced in the first slit 3 in which a cooling water is flowing. The first slit 3 is connected to the first water bath 4 positioned below the T-die 1, and the length of the first slit 3 is usually from 5 to 100 millimeters and preferably from 30 to 50 millimeters. In the first water bath 4, it is preferred that the cooling water coming into contact with the sheet-shaped thermoplastic resin should flow in a laminar flow state. In order to insure the laminar flow state of the cooling water, it is effective to increase the viscosity of the cooling water.

The surface smoothness and haze dots of the film or sheet is more improved when a viscous fluid is used as the cooling water. In this case, the viscosity of the viscous fluid is from 2 to 3,000 centipoises and preferably from 3 to 1,000 centipoises. A preferred example of such viscous fluids is an aqueous solution of an organic or inorganic thickening agent. As organic thickening agents, various compounds such as natural polymeric substances, and synthetic substances (including semisynthetic substances) can be used.

Examples of natural polymeric substances include starches such as potato starch, sweet potato starch, wheat starch, etc.; mannans such as konnyaku; seaweeds such as agar, sodium alginate, etc.; viscous substances originated in plant such as tragacanth gum, gum arabi, etc.; viscous substances originated in microorganism such as dextrin, levan, etc.; and proteins such as glue, gelatin, casein, collagen, etc. Examples of semi-synthetic substances include celluloses such as viscose, methyl cellulose, carboxymethyl cellulose, etc.; starch substances such as soluble starch, carboxymethyl starch, dialdehyde starch, etc. Examples of synthetic substances include polyvinyl alcohol, polymer of sodium acrylate, polyethylene oxide, etc.

Examples of inorganic thickening agents are silica sol, alumina sol, clay, water glass, and various metal salts.

In addition to the aqueous solutions as prepared by adding the thickening agents as described above, viscous substances such as polyethylene glycol, polypropylene glycol, and silicone oil can be used.

In the present invention, the cooling water is used to cool the sheet-shaped thermoplastic resin. The temperature of the cooling water is suitably within the range of from $-10°$ to $+50°$ C., with the range of from $2°$ to $30°$ C. being preferred. In the production of sheet having a thickness of at least 0.2 millimeter, the formation of haze dots can be effectively prevented by controlling the temperature of the cooling water to $20°$ C. or lower and preferably $10°$ C. or lower. The cooling efficiency can be further increased by improving the wetting properties of the sheet-shaped thermoplastic resin through the addition of surface active agents to the thickening agents as described above.

The water level should be kept as low as possible. This permits the prevention of partial boiling and the uniformalization of cooling points. The water level is preferably 7 millimeters or less. If the water level is higher than 10 millimeters, boiling dots, haze dots, and curls are formed in the sheet obtained, and the total haze becomes 25-28%. Thus it is undesirable that the water level exceeds 10 millimeters.

The cooling water flows from the first water bath 4 into the first slit 3. Hence the sheet-shaped thermoplastic resin is cooled by the cooling water when it passes through the first slit 3. That is, the sheet-shaped thermoplastic resin and the cooling water run in the same direction, and the cooling water flows on both surfaces of the sheet-shaped thermoplastic resin. Accordingly, the sheet-shaped thermoplastic resin is cooled efficiently. It is desirable for the flow rate of the cooling water to be equal to or higher than the running speed of the film-shaped thermoplastic resin.

Then, the sheet-shaped thermoplastic resin is sent to the second slit 5. It is suitable that the second slit 5 be positioned below the first slit 3 and the distance between the first and second slits be from 10 to 200 millimeters. The second slit 5 is connected to the second water bath 6, and the length of the second slit 5 is suitably from 5 to 100 millimeters and preferably from 30 to 50 millimeters as in the case of the first slit 3. In the same arrangement as above, the desired number of slit and water bath, such as the third slit and third water bath and the fourth slit and fourth water bath, can be provided. In the second slit and the subsequent slits, the sheet-shaped thermoplastic resin is cooled by flowing the cooling water thereon as in the case of the first slit 3. As shown in the drawings, a fresh cooling water is added to the second slit and the subsequent slits. In the second slit and the subsequent slits, however, the water level of the cooling water is not important or not critical. That is, this is due to the unexpected fact that the turbulence of the cooling water at these stages does not exert adverse influences on the quality of the sheet or film.

Figure 2:
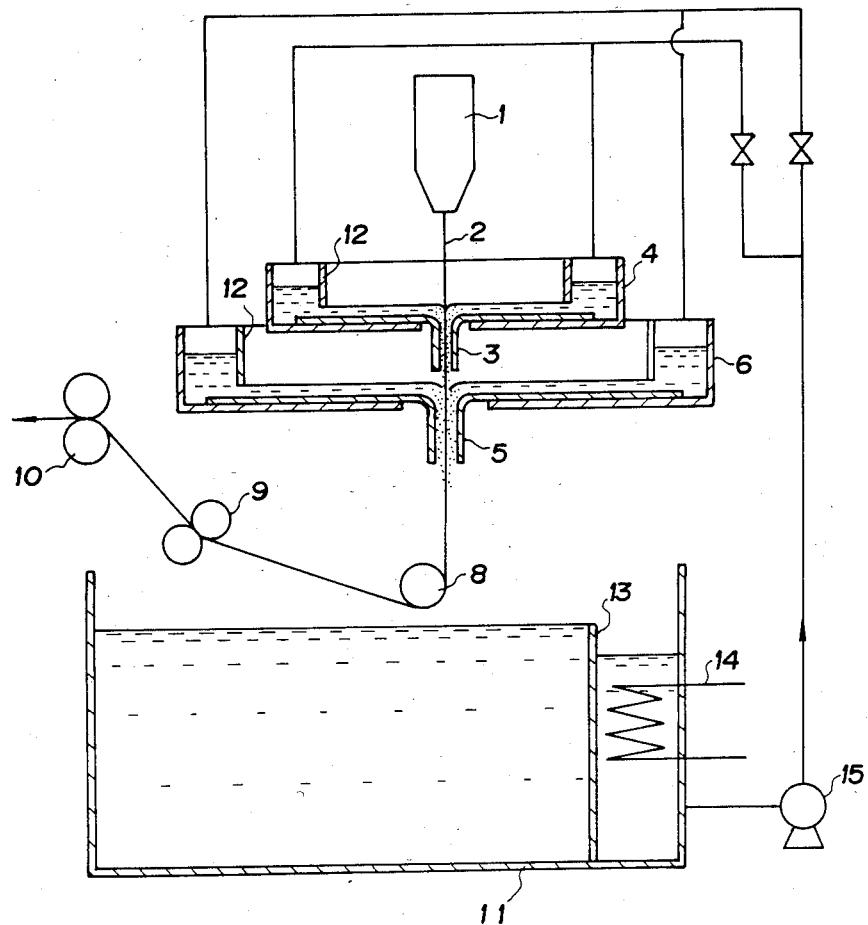
FIG. 2 is a schematic diagram showing another embodiment of the method of the present invention.

The sheet-shaped thermoplastic resin introduced and cooled in the multi-stage slit in which the cooling water flows is then withdrawn through guide rolls 7 and 8 and further draining roll 9 by take-off roll 10 as illustrated in FIG. 1, or is withdrawn through guide roll 8 and draining roll 9 by take-off roll 10 without passing through the water bath as illustrated in FIG. 2. The guide roll 7 is used to ensure that the sheet-shaped thermoplastic resin is always positioned in the central part of the slit and further to insure the accuracy of the sheet or film thickness by running the film-shaped thermoplastic resin at a fixed speed.

In the figures, the reference numeral 11 indicates a lower water bath; 12, a water level-controlling plate; 13, an overflow plate; 14, a cooler; and 15, a pump.

Although the present invention has been explained above referring to a water bath system in which the sheet-shaped thermoplastic resin is cooled, it can also be performed by a slit jet system with the same results as above.

When curls are observed in the sheet or film as obtained by the method of the invention, they can be completely removed by heating the sheet or film at a temperature of from 60° C. to the melting point of the thermoplastic resin, for example, at a temperature of from 80° to 130° C. in the case of propylene-based resins. This heat treatment is performed for from 1 second to 60 minutes and preferably from 5 seconds to 10 minutes. Although this heat treatment can be performed by known techniques, it is preferred to conduct by the roll annealing process using heating rolls.

In accordance with the method of the invention, when the nucleating agent is added, sheet or film of high rigidity can be produced without application of the annealing procedure. However, curling is liable to occur in sheet having a relatively high thickness. In this case, it is necessary to apply the annealing procedure to remove such curls. On the other hand, curling does not occur when any nucleating agent is not added. This annealing, however, increases the rigidity of sheet or film by 20–50% and further increases the transparency (haze) by about 50%. This increase of the transparency is an unexpected and astonishing fact.

In accordance with the method of the invention, even when crystalline thermoplastic resins are used as the starting material, there can be produced sheet or film which is not oriented and is superior in transparency and surface luster. Furthermore this sheet or film is freed of unevenness in thickness, wrinkles and curls, and thus are superior in uniformity.

The method of the invention has advantages in that sheet or film can be prepared by high-speed molding of at least 10 meters per minute, and the cooling cost, for example, is low.

The sheet or film produced by the method of the invention has superior properties as described above and therefore is suitable for use in wrapping of foods, medicines, etc. Further, the sheet or film can be used as a raw material for solid molding such as pressure molding, roll calender molding; and extension molding.

The present invention is described in greater detail with reference to the following Examples and Comparative Examples.

EXAMPLES 1 to 5

Polypropylene (density: 0.91 gram per cubic centimeter; melt index: 2.0 grams per ten minutes) was extruded at a resin temperature of 260° C. by means of a T-die extruder (diameter: 60 millimeters; L/D=28; die width: 550 millimeters; die lip opening: 1 millimeter). The molten resin sheet thus extruded was introduced in the first slit (width: 2 millimeters; length: 45 millimeters) in which a cooling water (temperature: 16° C.) was flowing and, thereafter, further in the second slit (width: 4 millimeters; length: 10 millimeters) provided below the first slit with a distance of 50 millimeters therebetween, in which a cooling water (temperature: 20° C.) was flowing. In this way, the molten resin sheet was cooled. The thus-cooled resin sheet was then withdrawn by means of take-off rolls as illustrated in FIG. 2 (excluding Examples 4 and 5), whereby a polypropylene sheet was formed. In Examples 4 and 5, the production of sheet was performed under combined conditions of those of Example 2 and those as shown in Note of Table 1. The operation conditions and the physical properties of the sheet prepared are shown in Table 1.

COMPARATIVE EXAMPLE 1

The procedure of Example 1 was repeated with the exception that the second slit was not used. The results are shown in Table 1.

COMPARATIVE EXAMPLE 2

A sheet-shaped resin in a molten state was extruded using the same starting material as used in Example 1 and also under the same conditions as in Example 1, and then cooled by blowing air on a planished roll (40° C.) by means of an air knife, whereby a polypropylene sheet was produced. The results are shown in Table 1.

TABLE 1

|  | Example | | | | | Comparative Example | |
|---|---|---|---|---|---|---|---|
|  | 1 | 2 | 3 | 4*2 | 5*3 | 1 | 2*4 |
| Molding Speed (m/min) | 15 | 20 | 25 | 20 | 20 | 20 | 20 |
| Sheet Thickness (mm) | 0.2 | 0.2 | 0.2 | 0.2 | 0.2 | 0.2 | 0.2 |
| Sheet Appearance | | | | | | | |
| Boiling Dots | none | none | none | none | none | none | none |
| Haze Dots | none | none | none | none | none | *1 | none |
| Curl | none | none | none | none | none | none | none |
| Sheet Haze | | | | | | | |
| Total Haze (%) | 10 | 10 | 13 | 10 | 10 | 18 | 42 |
| Internal Haze (%) | 3 | 4 | 6 | 4 | 5 | 8 | 22 |

TABLE 1-continued

|  | Example | | | | | Comparative Example | |
|---|---|---|---|---|---|---|---|
|  | 1 | 2 | 3 | 4*2 | 5*3 | 1 | 2*4 |
| External Haze (%) | 7 | 6 | 7 | 6 | 5 | 10 | 20 |

Note:
*1Some haze dots are observed.
*2Pressure rolls are provided after the second slit.
*3Pressure rolls are provided after the second slit, and cooling is performed by means of the lower water bath (20° C.).
*4Air marks are formed.

EXAMPLES 6 TO 10

Polypropylene (density: 0.91 gram per cubic centimeter; melt index: 2.0 grams per ten minutes) was extruded at a resin temperature of 250° C. by means of a T-die extruder (diameter: 60 millimeters; L/D=28; die width: 550 millimeters; die lip opening: 1.5 millimeters). The molten resin sheet thus extruded was introduced in the first slit (width: 2 millimeters; length: 45 millimeters) in which a cooling water (16° C.) was flowing, and then further in the second slit (width: 4 millimeters: length: 10 millimeters) provided below the first slit with a distance of 50 millimeters therebetween, in which a cooling water (20° C.) was flowing. In this way, the molten resin sheet was cooled. The thus-cooled sheet was withdrawn by means of take-off rolls as illustrated in FIG. 2, whereby a polypropylene sheet was prepared. In Examples 7 to 10, the sheet-formation was performed under combined conditions of those of Example 6 and those as shown in Note of Table 2. The operation conditions and the physical properties of the sheet prepared are shown in Table 2.

COMPARATIVE EXAMPLE 3

The procedure of Example 6 was repeated with the exception that the second slit was not used. The results are shown in Table 2.

COMPARATIVE EXAMPLE 4

A sheet-shaped resin in a molten state was extruded using the same starting material as used in Example 6 and also under the same conditions as in Example 6, and then cooled by blowing air on a planished roll (40° C.) by means of an air knife, whereby a polypropylene sheet was prepared. The results are shown in Table 2.

EXAMPLE 11

Propylene-ethylene-randomcopolymer (density: 0.90 gram per cubic centimeter; melt index: 7.0 grams per ten minutes; ethylene content: 4 weight percents) was extruded at a resin temperature of 220° C. by means of a T-die extruder (diameter: 60 millimeters; L/D=28, die width: 550 millimeters; die lip opening: 1.5 millimeters). The molten resin sheet thus extruded was introduced in the first slit (width: 2 millimeters; length: 45 millimeters) in which a cooling water (16° C.) was flowing, and then further in the second slit (width: 4 millimeters; length: 10 millimeters) provided below the first slit with a distance of 50 millimeters therebetween, in which a cooling water (20° C.) was flowing. In this way, the molten resin sheet was cooled. The thus-cooled sheet was withdrawn by means of take-off rolls as illustrated in FIG. 2, whereby a polypropylene sheet was prepared.

The sheet production was performed under combined conditions of those of Example 6 and those as shown in Note of Table 2. The operation conditions and the physical properties of the sheet prepared are shown in Table 2.

TABLE 2

|  | Example | | | | | | Comparative Example | |
|---|---|---|---|---|---|---|---|---|
|  | 6 | 7*7 | 8*8 | 9*9 | 10*10 | 11*9 | 3 | 4*11 |
| Molding Speed (m/min) | 20 | 20 | 20 | 20 | 20 | 20 | 20 | 20 |
| Sheet Thickness (mm) | 0.25 | 0.25 | 0.25 | 0.25 | 0.25 | 0.25 | 0.25 | 0.25 |
| Sheet Appearance | | | | | | | | |
| Boiling Dots | none | none | none | none | none | none | none | none |
| Haze Dots | *1 | none | none | none | none | none | *2 | none |
| Curl | *3 | *4 | none | none | none | none | *4 | none |
| Fine Surface Irregularity | *5 | *5 | none | *5 | none | *5 | *6 | none*12 |
| Sheet Haze | | | | | | | | |
| Total Haze (%) | 21 | 11 | 22 | 14 | 11 | 8 | 20–28 | 48 |
| Internal Haze (%) | 10 | 5 | 16 | 4 | 5 | 4 | 8–10 | 24 |
| External Haze (%) | 11 | 6 | 6 | 10 | 6 | 4 | 12–18 | 24 |
| Modulus of Elasticity | | | | | | | | |
| MD (kg/cm$^2$) | 14000 | 23000 | 14000 | 18000 | 24000 | 12000 | 13000 | 13000 |

TABLE 2-continued

|  | Example | | | | | | Comparative Example | |
| --- | --- | --- | --- | --- | --- | --- | --- | --- |
|  | 6 | 7*7 | 8*8 | 9*9 | 10*10 | 11*9 | 3 | 4*11 |
| TD (kg/cm$^2$) | 13000 | 25000 | 14000 | 18000 | 25000 | 12000 | 13000 | 14000 |

Note:
*1Some haze dots are formed.
*2Haze dots are formed.
*3Curling occurs slightly.
*4Curling occurs.
*5Irregularity is slightly formed.
*6Irregularity is formed.
*70.2% by weight of dibenzylidene sorbitol is added to the polypropylene of Example 6.
*80.001% by weight of carboxymethyl cellulose is added to the cooling water of Example 6.
*9In-line roll annealing (roll temperature: 120° C.) is applied in Example 6.
*10Example 7 + 8 + 9
*11Air marks are formed.
*12Surface is frosted glass like.

What is claimed is:

1. A method of producing a thermoplastic sheet or film, comprising:
   extruding a molten thermoplastic resin through a T-die to form an extruded sheet or film;
   passing said extruded sheet or film through a first stationary slit in which a cooling water is flowing, such that said sheet or film is contacted with cooling water in said first slit, said cooling water flowing in cocurrent substantially nonturbulent, laminar flow with said sheet or film to cool said sheet or film, and exiting said cooled sheet or film from said first slit; and
   then passing said exited cooled sheet or film through at least a second stationary slit in which a cooling water is flowing, said second slit being below and spaced from said first slit such that said sheet or film is contacted with cooling water in said second slit, said cooling water flowing in cocurrent, substantially non-turbulent, laminar flow with said sheet or film to further cool said sheet or film, and then exiting said further cooled sheet or film from said second slit;
   the flow rate of cooling water through said slits being at least equal to the running speed of said sheet or film through said slits.

2. The method of claim 1, wherein said extruded sheet or film is passed substantially vertically through said first and second slits.

3. The method of claim 2, wherein said first and second slits are arranged in substantially vertical alignment.

4. The method of claim 1, comprising first and second cooling water supply means supplying cooling water to said first and second slits, respectively, and wherein the water level in said first cooling water supply means is lower than that of said second cooling water supply means.

5. The method of claim 4, wherein the water level in said first cooling water supply means ranges up to about 10 mm maximum.

6. The method of claim 5, wherein the water level in said first cooling water supply means ranges up to about 7 mm maximum.

7. The method of claim 4, wherein said extruded sheet or film is passed substantially vertically through said first and second slits.

8. The method of claim 1, wherein only said first and second slits are provided.

9. The method of claim 8, wherein said extruded sheet or film is passed substantially vertically through said first and second slits.

10. The method of claim 1, wherein the flow rate of the cooling water through said slits is higher than the running speed of said sheet or film through said slits.

11. The method of claim 1, wherein the spacing between said first and second slits ranges from about 10 to 200 mm.

12. The method of claim 11, wherein the length of said second slit ranges from between about 5 to 100 mm.

13. The method of claim 12, wherein the length of said second slit ranges from about 30 to 50 mm.

14. The method of claim 1, comprising passing said sheet or film from said second slit through a cooling water tank spaced below said second slit.

15. The method of claim 1, comprising passing said sheet or film, after it exits through said second slit, over at least one guide roll to maintain said sheet or film substantially centrally located in said slits.

16. The method of claim 1, comprising passing said sheet or film through said first and second slits at a rate of at least 10 meters per minute.

17. The method of claim 1, comprising contacting both opposite sides of said sheet or film with cooling water as it passes through said first slit, and contacting both opposite sides of said sheet or film with said cooling water as it passes through said second slit.

* * * * *